United States Patent
Chiu et al.

(10) Patent No.: US 9,465,543 B2
(45) Date of Patent: Oct. 11, 2016

(54) FINE-GRAINED DATA REORGANIZATION IN TIERED STORAGE ARCHITECTURES

(71) Applicant: International Business Machines Corporation, Armonk, NY (US)

(72) Inventors: Lawrence Y. Chiu, Saratoga, CA (US); Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 14/158,802

(22) Filed: Jan. 18, 2014

(65) Prior Publication Data

US 2015/0205525 A1    Jul. 23, 2015

(51) Int. Cl.
G06F 3/06 (2006.01)
G06F 17/30 (2006.01)

(52) U.S. Cl.
CPC ............... *G06F 3/061* (2013.01); *G06F 3/065* (2013.01); *G06F 3/067* (2013.01); *G06F 3/0643* (2013.01); *G06F 3/0644* (2013.01); *G06F 3/0647* (2013.01); *G06F 17/30221* (2013.01)

(58) Field of Classification Search
None
See application file for complete search history.

(56) References Cited

U.S. PATENT DOCUMENTS

| | | | |
|---|---|---|---|
| 8,381,213 B1 | 2/2013 | Naamad et al. | |
| 8,429,346 B1 * | 4/2013 | Chen et al. | 711/114 |
| 8,918,392 B1 * | 12/2014 | Brooker et al. | 707/736 |
| 2006/0153026 A1 * | 7/2006 | Blacquiere et al. | 369/47.1 |
| 2008/0154985 A1 * | 6/2008 | Childs et al. | 707/204 |
| 2014/0201437 A1 * | 7/2014 | Endres | 711/112 |

OTHER PUBLICATIONS

Zhang et al. "De-indirection for Flash-based SSDs with Nameless Writes." Feb. 2012. USENIX. FAST '12.*
Curtis E. Stevens, editor. "Enhanced Disk Drive Specification." May 1995. Phoenix. Version 1.1.*
Bill McFerrin, ed. Information Technology—Multimedia Commands—4 (MMC-4). Nov. 2004. INCITS. Rev. 5. pp. 28-29, 289-301, 548-549.*
Guerra et al. "Cost Effective Storage using Extent Based Dynamic Tiering." Feb. 2011. USENIX. FAST '11.*

* cited by examiner

*Primary Examiner* — Nathan Sadler
(74) *Attorney, Agent, or Firm* — Nelson and Nelson; Daniel P. Nelson; Alexis V. Nelson

(57) ABSTRACT

A method for organizing data at levels of granularity larger or smaller than an extent is disclosed. The method initially closes a dataset on a host system. The host system includes a mapping table storing a logical address of the dataset. When the dataset is closed, the host system generates a message indicating that the dataset has been closed and sends the message to a storage system storing the dataset. In response, the storage system allocates a new logical address and copies the dataset from the existing logical address to the new logical address to improve data placement. The storage system then returns the new logical address to the host system so that the host system can update its mapping table. A corresponding system and computer program product are also disclosed.

20 Claims, 6 Drawing Sheets

FINE-GRAINED DATA REORGANIZATION IN TIERED STORAGE ARCHITECTURES

BACKGROUND

1. Field of the Invention

This invention relates to apparatus and methods for organizing data at levels of granularity that are larger or smaller than an extent.

2. Background of the Invention

In today's tiered storage architectures, the "hotness" or "coldness" of data may be continually monitored so that it can be optimally placed on storage media. For example, "hot" (i.e., frequently accessed) data may be placed on faster, more expensive storage media (e.g., solid state drives) to improve I/O performance. "Cold" (i.e., less frequently accessed) data may be placed on slower, less expensive storage media (e.g., hard disk drives) with reduced I/O performance. As the temperature of the data changes, the data may be migrated between storage tiers to optimize I/O performance.

In some tiered storage architectures, data is migrated between tiers at the granularity of an extent. For example, the IBM DS8000™ storage system moves data between tiers in one GB extents. Unfortunately, the granularity of extents may differ significantly from the granularity of data at the application or higher layers. For example, an application may manage data in the form of files or datasets, which may be considerably smaller or larger than extents. Like the temperature of extents, the "hotness" and "coldness" of files or datasets may differ from one another. Because a storage system may be unaware of data organization at the application layer, data may be organized in an inefficient manner on the underlying storage media. For example, because a single extent may contain both "hot" and "cold" datasets, moving the extent to faster storage media will move not only the "hot" datasets to the faster storage media, but also the "cold" datasets, resulting in less than optimal data organization and poor utilization on the underlying storage media.

In view of the foregoing, what are needed are apparatus and methods to more optimally organize data in tiered storage architectures. Ideally, such apparatus and methods will enable storage systems to organize data at levels of granularity that are larger or smaller than an extent.

SUMMARY

The invention has been developed in response to the present state of the art and, in particular, in response to the problems and needs in the art that have not yet been fully solved by currently available apparatus and methods. Accordingly, the invention has been developed to provide finer-grained data organization within extents of a storage system. The features and advantages of the invention will become more fully apparent from the following description and appended claims, or may be learned by practice of the invention as set forth hereinafter.

Consistent with the foregoing, a method for organizing data at levels of granularity larger or smaller than an extent is disclosed. The method initially closes a dataset on a host system. The host system includes a mapping table storing a logical address of the dataset. When the dataset is closed, the host system generates a message indicating that the dataset has been closed and sends the message to a storage system storing the dataset. In response, the storage system allocates a new logical address and copies the dataset from the existing logical address to the new logical address to improve data placement. The storage system then returns the new logical address to the host system so that the host system can update its mapping table.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
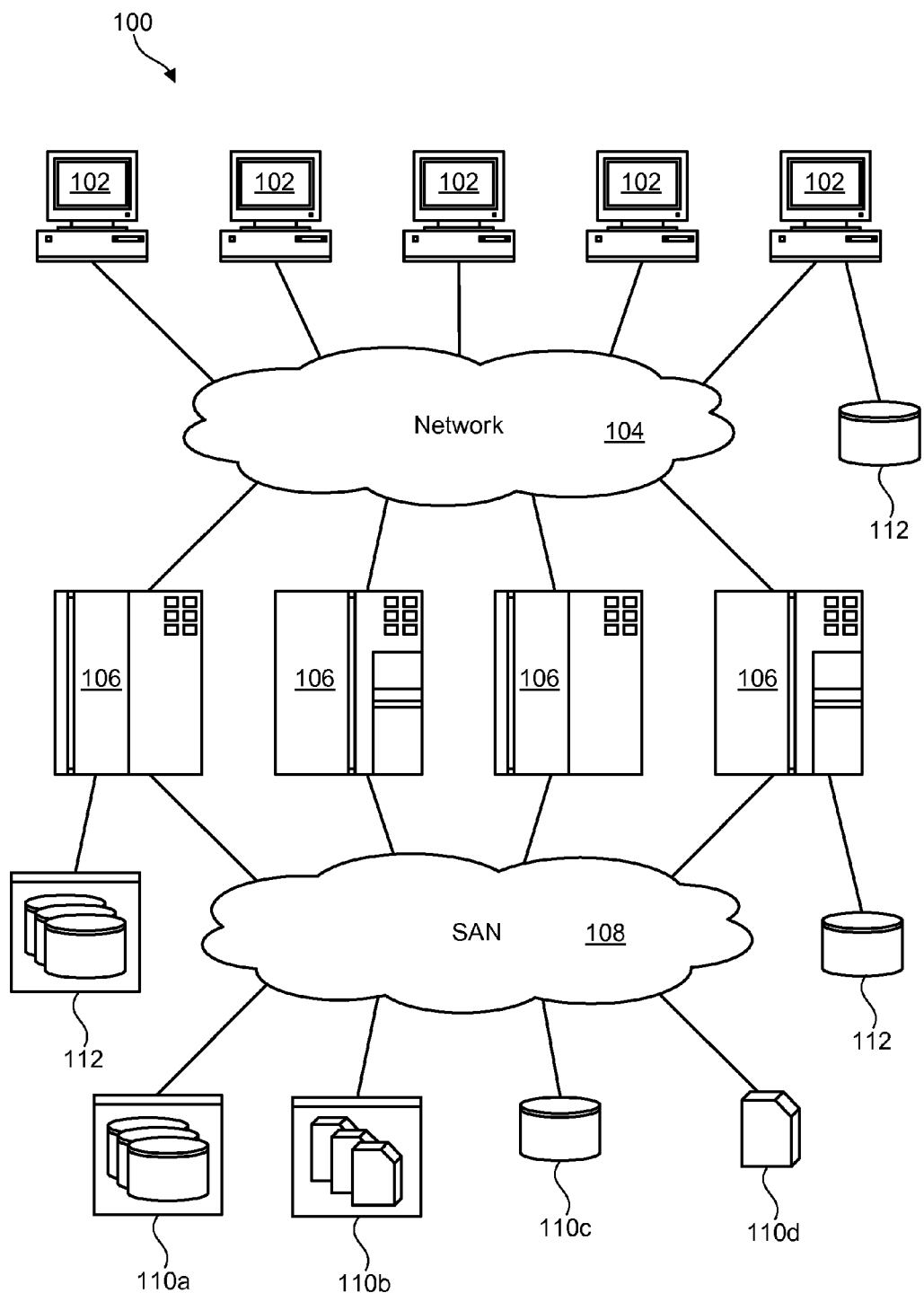
FIG. 1 is a high-level block diagram showing one example of a storage network in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a storage network architecture 100 is illustrated. The storage network architecture 100 is presented to show one example of an environment where an apparatus and method in accordance with the invention may be implemented. The storage network architecture 100 is presented only by way of example and not limitation. Indeed, the apparatus and methods disclosed herein may be applicable to a wide variety of network architectures, in addition to the storage network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the apparatus and methods disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the apparatus and methods disclosed herein.

Figure 2:
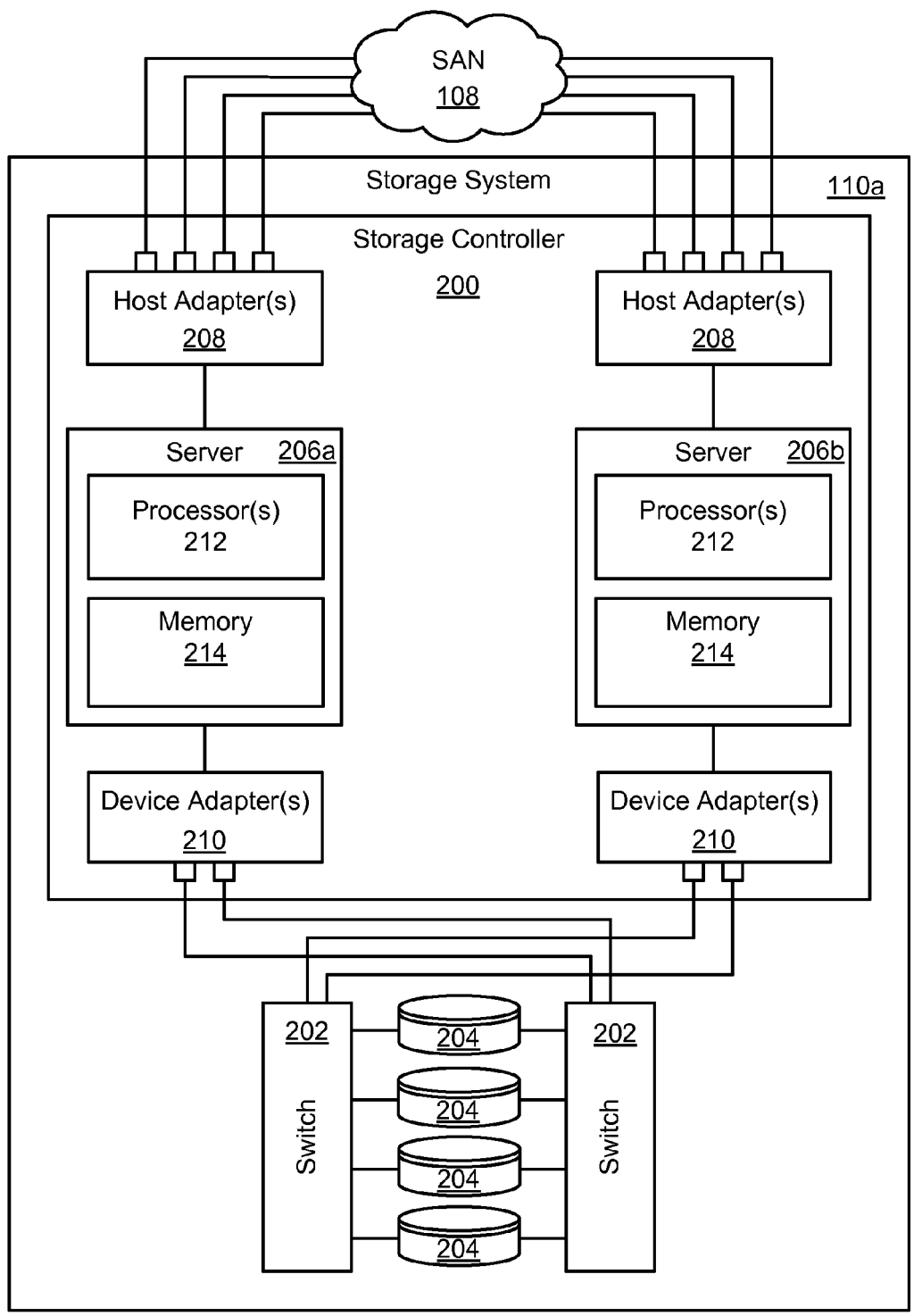
FIG. 2 is a high-level block diagram showing one example of a storage system in which an apparatus and method in accordance with the invention may be implemented.

Referring to FIG. 2, one embodiment of a storage system 110a containing an array of hard-disk drives 204 and/or solid-state drives 204 is illustrated. The internal components of the storage system 110a are shown since the apparatus and methods disclosed herein may, in certain embodiments, be implemented within such a storage system 110a, although the apparatus and methods may also be applicable to other storage systems 110. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

In certain embodiments, the storage system 110 may provide tiered data storage. In such a system, the "hotness" or "coldness" of data may be continually monitored so that it can be optimally placed on different tiers of the storage system 110. For example, faster storage devices 204 (e.g., solid state drives) may make up a first tier, while slower storage devices 204 (e.g., hard drives) may make up a second tier. "Hot" (i.e., frequently accessed) data may be placed on the first tier to improve I/O performance, while "cold" (i.e., less frequently accessed) data may be placed on the second tier. As the temperature of the data changes, the data may be migrated between the storage tiers to optimize I/O performance. The storage tiers may be implemented within a single storage system 110 or potentially distributed across multiple storage systems 110. Similarly, additional tiers may be provided where needed. The example described above is provided only by way of example and not limitation.

In some tiered storage architectures, data is migrated between tiers at the granularity of an extent. For example, the IBM DS8000™ storage system moves data between tiers in one GB extents. Other extent sizes are also possible and within the scope of the invention. Unfortunately, the granularity of extents may differ significantly from the granularity of data used by applications or higher layers running on a host system 106. For example, an application may manage data at the level of files or datasets, which may be smaller or larger than extents. Like the temperature of extents, the "hotness" and "coldness" of files or datasets may differ from one another. Because a storage system 110 may be unaware of data entities at the application level, storage space may be poorly utilized and inefficiently organized. For example, because a single extent may contain both "hot" and "cold" datasets, moving the extent to faster storage media will move not only the "hot" datasets to the faster storage media, but also the "cold" datasets, resulting in inefficient use of storage space on the faster storage media.

Figure 3:
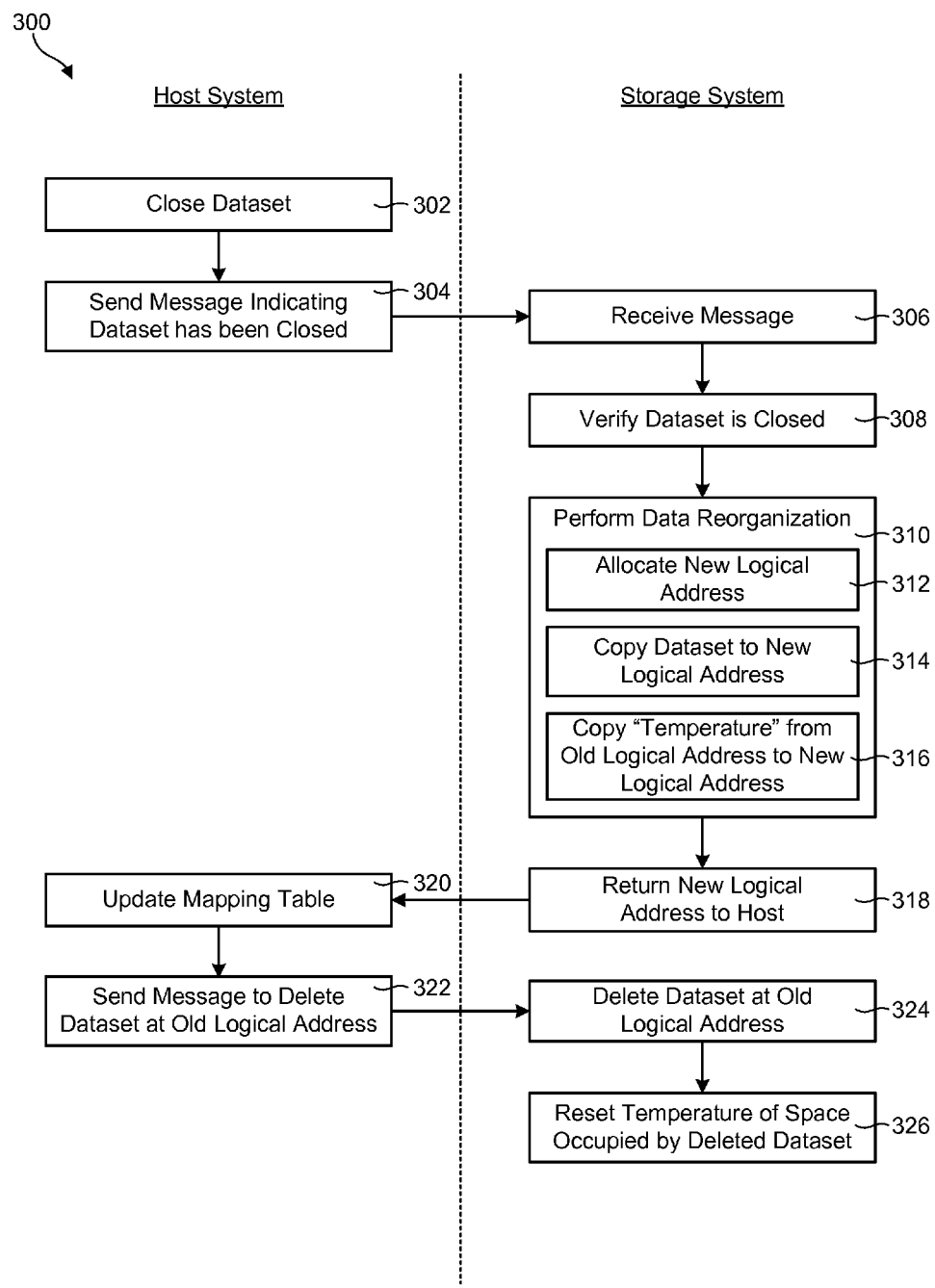
FIG. 3 is a flow diagram showing one embodiment of a method for organizing data at levels of granularity that are larger or smaller than an extent.

Referring to FIG. 3, one embodiment of a method 300 for organizing data at levels of granularity larger or smaller than an extent is illustrated. Such a method 300 may be used to address the sub-optimal data organization discussed above. As will be explained in more detail hereafter, the method 300 relies on various hints (i.e., messages) that may be sent from a host system 106 to a storage system 110 to indicate the status of datasets on the host system 106. The storage system 110 may use these hints to determine when datasets can be safely reorganized on the storage devices 204. For example, when a dataset is open and being referenced on a host system 106, the storage system 110 is not able to move the dataset on the underlying storage media in a way that would change the logical address of the dataset. A storage system 110 is typically unaware of close events occurring on a host system 106. In order to know when a dataset can be safely moved on the storage media, the storage system 110 may need information indicating whether the dataset is open or closed. The method 300 described in association with FIG. 3 provides a mechanism for passing information between a host system 106 and a storage system 110.

As shown in FIG. 3, an application or higher layer on a host system 106 may close 302 a dataset (the term "dataset" is used broadly herein to refer to files, database tables, or other data entities). Upon closing the dataset, the host system 106 sends 304 a message to the storage system 110 storing the dataset. This message may be sent either "in-band" (i.e., through the same channel as I/O traffic) or "out-of-band" (i.e., through a channel other than a channel used for I/O traffic). The message indicates that the dataset has been closed and may include information about the dataset such as the logical address, size, and/or range (i.e., beginning and ending logical address) associated with the dataset.

Upon receiving 306 the message, the storage system 110 verifies 308 that the dataset has been closed. If possible, the storage system 110 performs 310 a data reorganization that improves the placement of the dataset and changes its logical address. To perform such a data reorganization, the storage system 110 allocates 312 a new logical address for the dataset and copies 314 the dataset from the existing logical address to the new logical address. The storage system 110 may also copy 316 the "temperature" of the dataset from the old logical address to the new logical address. In other words, if the dataset at the old logical address is considered to be "hot", the dataset may still be considered to be "hot" after it is moved to its new logical address.

Once the dataset has been copied, the method 300 returns 318 the new logical address to the host system 106, thereby allowing the host system 106 to update 320 its mapping table. Once the host system 106 has updated 320 its mapping table, the host system 106 may send 322 a message to the storage system 110 to delete the dataset at the old logical address. Upon receiving this message, the storage system 110 deletes 324 the dataset at the old logical address and resets 326 the temperature of the storage space formerly occupied by the deleted dataset. This will ensure that the space formerly occupied by the deleted dataset is no longer considered "hot" or "cold".

Figure 4:
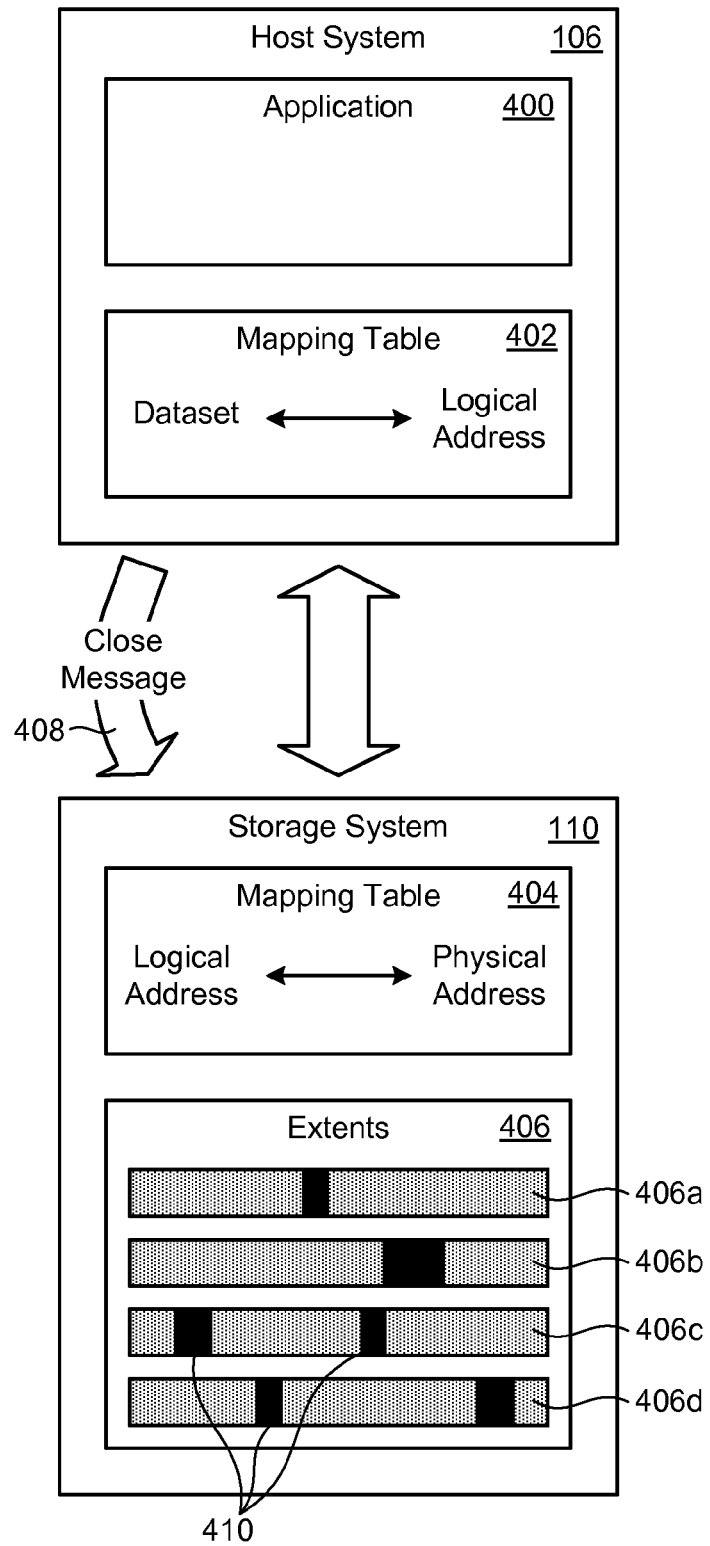
FIG. 4 is a high-level block diagram showing fragmented "hot" datasets within extents of a storage system prior to data reorganization.

Referring to FIG. 4, a high-level block diagram showing fragmented "hot" datasets within extents of a storage system prior to data reorganization is illustrated. As shown in FIG. 4, a host system 106 includes one or more applications 400 and a mapping table 402. As previously mentioned, applications 400 may manage data in the form of files or datasets, which are stored on a storage system 110. The logical addresses of these files or datasets may be recorded in the mapping table 402. The host system 106 and applications 400 may be unaware of the actual physical addresses of the files or datasets on the storage system 110.

The storage system 110, by contrast, may include a mapping table 404 to map logical addresses to physical addresses on the underlying storage media. The storage system 110 may store datasets on physical extents 406a-d of the storage media. When the storage system 110 migrates data between extents, such as when moving data between slower storage devices 204 and faster storage devices 204, or vice versa, the physical addresses of the data may change while retaining the logical addresses of the data. From the perspective of the host system 106 and applications 400, the locations of datasets may remain the same even though the data is physically moved on the underlying storage media 204.

When a dataset is moved to a new location within an extent or to a different relative location in a different extent, both the physical address and the logical address of the dataset will change. In such cases, the storage system 110 cannot move the dataset unless the dataset is closed and no longer referenced by an application 400 or host system 106. To enable such moves within the storage system 110, a host system 106 may send a message 408 to the storage system 110 indicating when a dataset is closed and a reorganization may be initiated.

For example, consider the example illustrated in FIG. 4. As shown in FIG. 4, the storage system 110 includes multiple extents 406a-d located on storage devices 204. The storage system 110 may monitor the "temperature" of data in the extents 406a-d. The storage system 110 may use the "temperature" of the data to more efficiently organize data in the extents 406a-d, such as by placing "hot" data near other "hot" data and "cold" data near other "cold" data.

As shown in FIG. 4, each of the extents 406a-d may include one or more "hot" datasets 410. In some cases, the "hot" datasets 410 may occupy only a small fraction of the space in the extents 406a-d. In order to more optimally place the "hot" datasets 410 in the storage system 110, the datasets 410 may be moved to a common extent or extents. The common extent or extents may then be migrated to higher performance storage media, such as solid state drives, to improve I/O performance.

Figure 5:
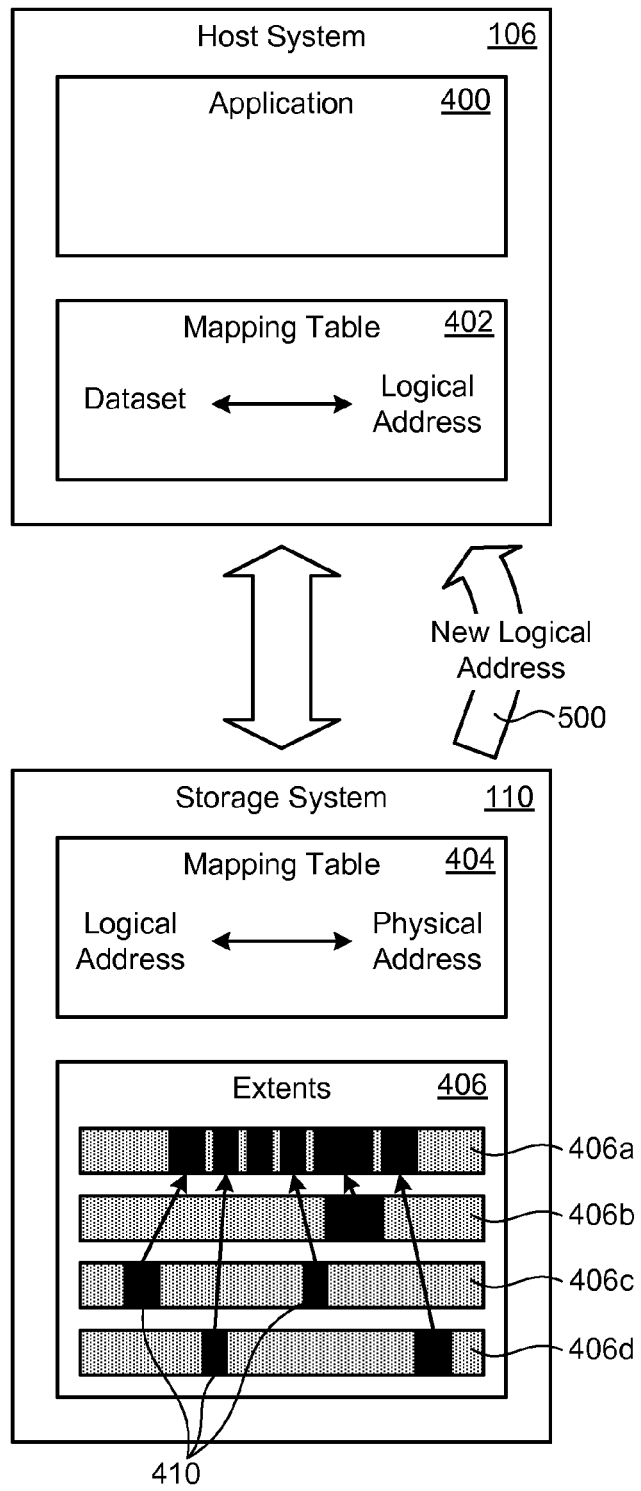
FIG. 5 is a high-level block diagram showing "hot" datasets that are copied to a common extent during data reorganization.

For example, referring to FIG. 5, upon receiving a close message 408 for a dataset 410, the dataset 410 may be allocated a new logical address and copied to an extent 406a. The new logical address and physical address of the dataset may then be updated in the storage system mapping table 404. The "temperature" of the dataset may be copied or recorded for the new logical address to reflect the value for the old logical address. The new logical address 500 for the copied dataset 410 may be returned to the host system 106 so that the host system 106 can update its mapping table 402.

Figure 6:
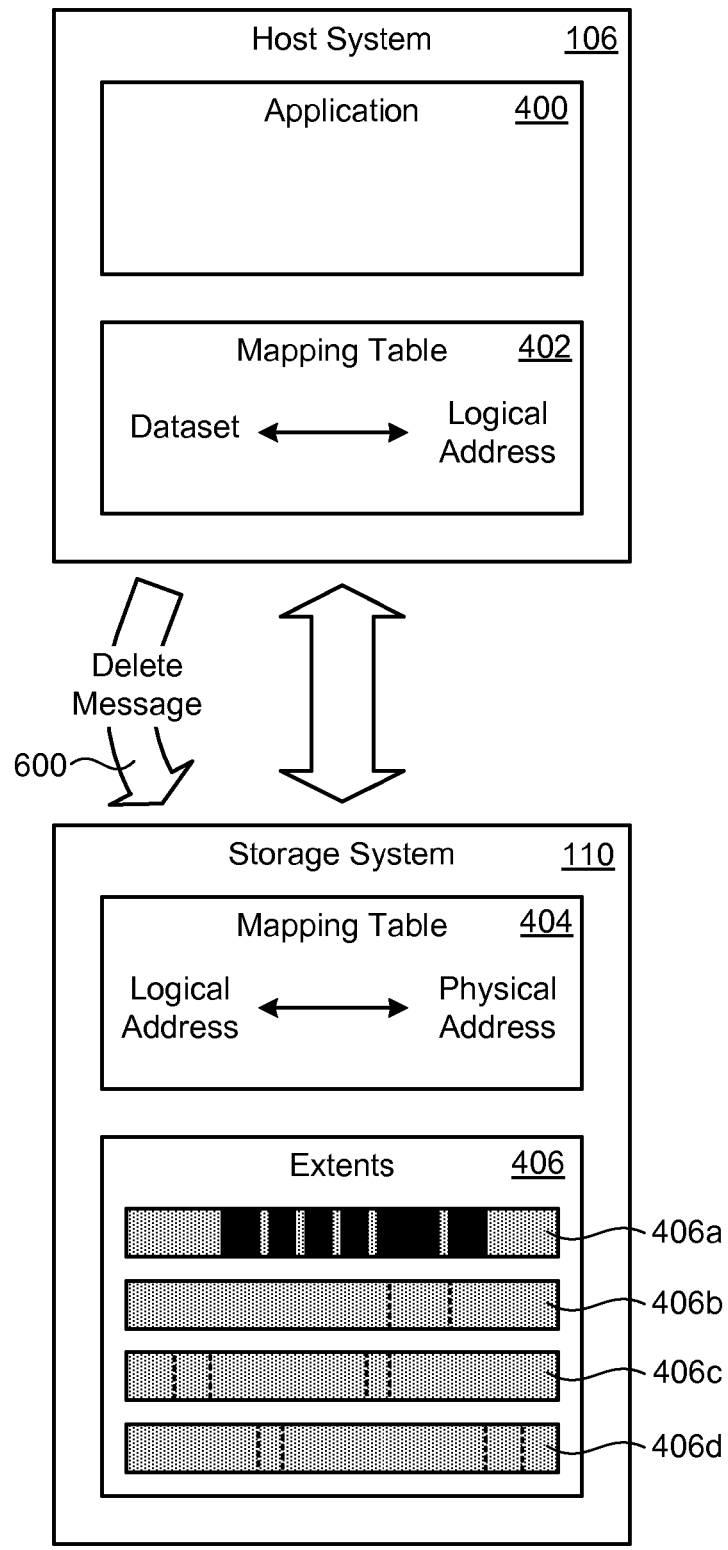
FIG. 6 is a high-level block diagram showing deletion of datasets after data reorganization.

Referring to FIG. 6, upon receiving a new logical address for a copied dataset 410, the host system 106 may issue a delete message 600 to delete the dataset located at the old logical address. Upon receiving the delete message 600, the storage system 110 may delete the dataset at the old logical address (as shown by the dotted lines). Deleting the dataset may include resetting the "temperature" of the storage space occupied by the deleted dataset.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for organizing data at levels of granularity larger or smaller than an extent, the method comprising:
   providing a tiered storage system comprising a plurality of tiers, wherein the tiered storage system is configured to move data between the tiers at the granularity of an extent;
   providing a host system to access data in the tiered storage system;
   storing a file in an extent of the plurality of extents, the file having a logical address associated therewith, wherein movement of the file within an extent changes the logical address, but movement of an extent between tiers of the tiered storage system does not change the logical address;
   closing the file on the host system;
   upon closing the file, generating, by the host system, a message indicating that the file has been closed and identifying an old logical address associated with the file;
   sending the message to the tiered storage system;
   verifying, by the tiered storage system, that the file has been closed;
   in the event the file has been closed, copying the file from the old logical address to a new logical address to improve data placement; and
   returning, by the tiered storage system, the new logical address to the host system.

2. The method of claim 1, further comprising sending, by the host system to the tiered storage system, a message to delete the file located at the old logical address.

3. The method of claim 2, further comprising deleting, by the tiered storage system, the file located at the old logical address and resetting a "temperature" for space occupied by the deleted file.

4. The method of claim 1, wherein the logical address associated with the file identifies a relative location of the file within an extent.

5. The method of claim 1, wherein sending the message comprises sending the message through an "in-band" communication channel.

6. The method of claim 1, wherein copying the file from the old logical address to the new logical address further comprises copying a "temperature" associated with the old logical address to the new logical address.

7. The method of claim 1, wherein copying the file comprises copying the file to an extent comprising other files of similar "temperature".

8. A computer program product for organizing data at levels of granularity larger or smaller than an extent, the computer program product comprising a non-transitory computer-readable storage medium having computer-usable program code embodied therein, the computer-usable program code comprising:
   computer-usable program code to manage a tiered storage system comprising a plurality of tiers, wherein the tiered storage system is configured to move data between the tiers at the granularity of an extent;
   computer-usable program code to enable a host system to access data in the tiered storage system;

computer-usable program code to store a file in an extent of the plurality of extents, the file having a logical address associated therewith, wherein movement of the file within an extent changes the logical address, but movement of an extent between tiers of the tiered storage system does not change the logical address;

computer-usable program code to close the file on the host system;

computer-usable program code to, upon closing the file, generate, at the host system, a message indicating that the file has been closed and identifying an old logical address associated with the file;

computer-usable program code to send the message to the tiered storage system;

computer-usable program code to verify, at the tiered storage system, that the file has been closed;

computer-usable program code to, in the event the file has been closed, copy the file from the old logical address to a new logical address to improve data placement; and computer-usable program code to return the new logical address to the host system.

9. The computer program product of claim 8, further comprising computer-usable program code to send, from the host system to the tiered storage system, a message to delete the file located at the old logical address.

10. The computer program product of claim 9, further comprising computer-usable program code to delete, at the tiered storage system, the file located at the old logical address and reset a "temperature" for space occupied by the deleted file.

11. The computer program product of claim 8, wherein the logical address associated with the file identifies a relative location of the file within an extent.

12. The computer program product of claim 8, wherein sending the message comprises sending the message through an "in-band" communication channel.

13. The computer program product of claim 8, wherein copying the file from the old logical address to the new logical address further comprises copying a "temperature" associated with the old logical address to the new logical address.

14. The computer program product of claim 8, wherein copying the file comprises copying the file to an extent comprising other files of similar "temperature".

15. A system for organizing data at levels of granularity larger or smaller than an extent, the system comprising:

a tiered storage system comprising a plurality of tiers, wherein the tiered storage system is configured to move data between the tiers at the granularity of an extent;

a host system to access data in the tiered storage system;

a file stored in an extent of the plurality of extents, the file having a logical address associated therewith, wherein movement of the file within an extent changes the logical address, but movement of an extent between tiers of the tiered storage system does not change the logical address;

the host system further configured to close the file;

the host system further configured to, upon closing the file, generate a message indicating that the file has been closed and identifying an old logical address associated with the file;

the host system further configured to send the message to the tiered storage system;

the tiered storage system configured to verify that the file has been closed;

the tiered storage system further configured to, in the event the file has been closed, copy the file from the old logical address to a new logical address to improve data placement; and the tiered storage system further configured to return the new logical address to the host system.

16. The system of claim 15, wherein the host system is configured to send, to the tiered storage system, a message to delete the file located at the old logical address.

17. The system of claim 16, wherein the tiered storage system is configured to delete the file located at the old logical address and reset a "temperature" for space occupied by the deleted file.

18. The system of claim 15, wherein the logical address associated with the file identifies a relative location of the file within an extent.

19. The system of claim 15, wherein the host system is configured to send the message through an "in-band" communication channel.

20. The system of claim 15, wherein the tiered storage system is configured to copy the file to an extent comprising other files of similar "temperature".

* * * * *